Feb. 20, 1951    J. F. SHIRK    2,542,438
PISTON RING
Filed Oct. 4, 1947    2 Sheets-Sheet 1
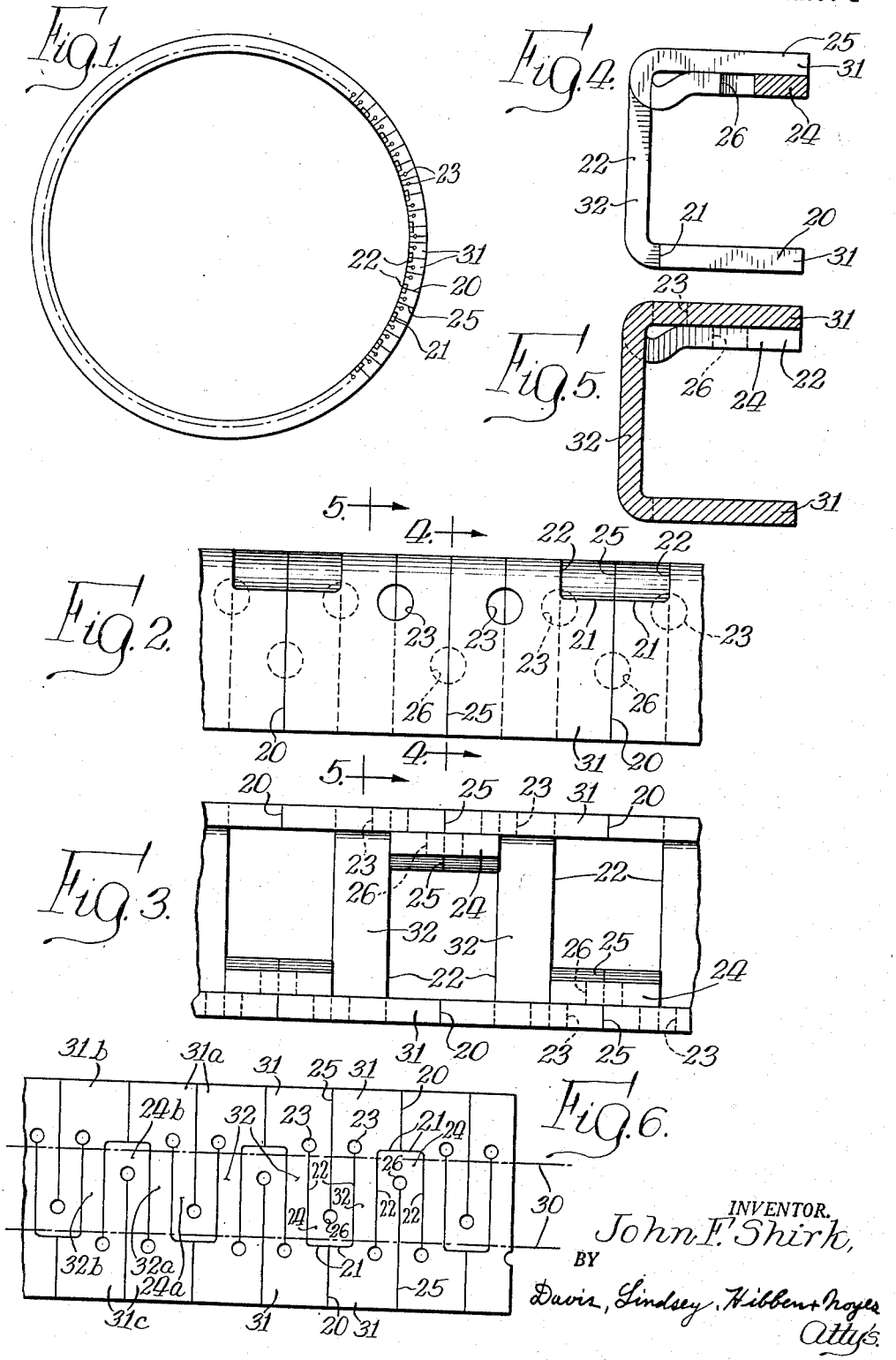
INVENTOR.
John F. Shirk,
BY
Davis, Lindsey, Hibben + Noyes
Atty's.

Feb. 20, 1951  J. F. SHIRK  2,542,438
PISTON RING
Filed Oct. 4, 1947  2 Sheets-Sheet 2
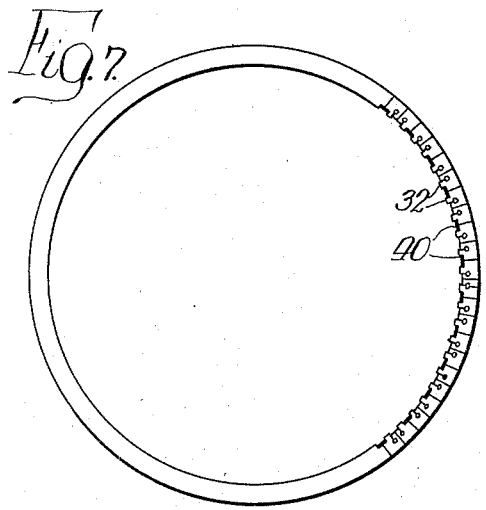
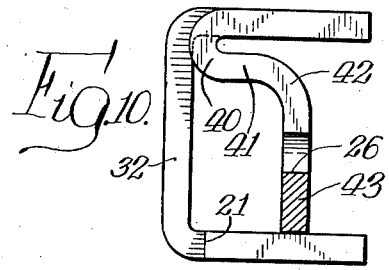
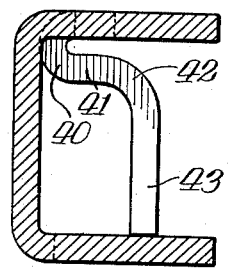
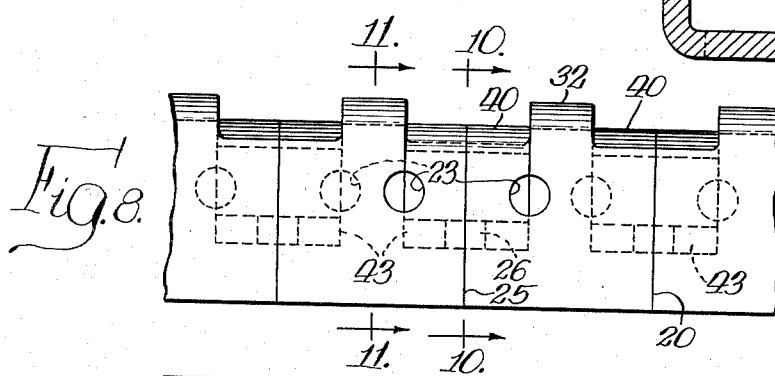
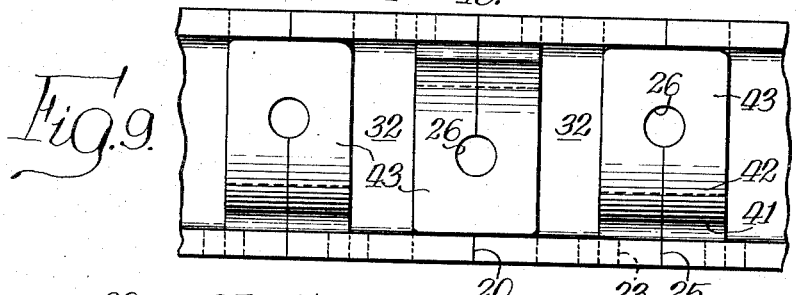
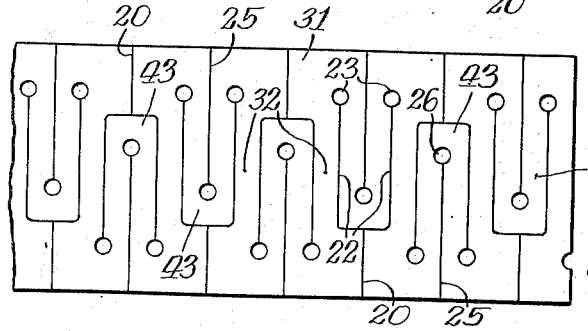
INVENTOR.
John F. Shirk,
BY
Davis, Lindsey, Hibben & Noyes
Attys.

Patented Feb. 20, 1951

2,542,438

UNITED STATES PATENT OFFICE 2,542,438

PISTON RING

John F. Shirk, Hagerstown, Ind., assignor to Perfect Circle Corporation, Hagerstown, Ind., a corporation of Indiana Application October 4, 1947, Serial No. 777,989

14 Claims. (Cl. 309—45)

The invention relates generally to piston rings and more particularly to a circumferentially expansible piston ring made of sheet metal.

The general object of the invention is to provide a novel piston ring of the foregoing type, which has a relatively large circumferential expansion for a given load.

Another object is to provide a novel piston ring of the foregoing type, in which, for a given amount of circumferential expansion, only a small angular deflection of metal at any point in the ring occurs.

A further object is to provide a novel piston ring of the foregoing type, comprising a pair of segmentally formed rails or flanges connected by web members, the segments being of relatively small circumferential dimension so that as the ring expands the opening between adjacent segments will be held to a minimum.

Still another object is to provide a novel piston ring of the foregoing character, having a pair of segmentally formed rails or flanges with the segments in each flange separated by slits, the rings also including portions which underlie certain of such slits to reduce the passage of oil past the flanges of the ring.

More broadly stated, it is an object to provide a piston ring of the foregoing character, comprising a pair of segmentally formed rails or flanges, which, in spite of the segmental construction, permits very little passage of oil past the flanges.

Other objects and advantages will become apparent from the following description taken in connection with the accompanying drawings, in which:

Figure 1 is a plan view of a ring embodying the features of the invention.

Fig. 2 is an enlarged fragmentary plan view of the ring before it has been formed into annular shape.

Fig. 3 is an edge view of the fragment shown in Fig. 2.

Fig. 4 is a transverse sectional view taken on the line 4—4 of Fig. 2.

Fig. 5 is a transverse sectional view taken on the line 5—5 of Fig. 2.

Fig. 6 is a plan view of a strip of metal from which the ring shown in the preceding figures is made.

Fig. 7 is a plan view of a modified form of ring.

Fig. 8 is an enlarged fragmentary plan view of the ring shown in Fig. 7 before it is bent into annular form.

Fig. 9 is an edge view of the fragment shown in Fig. 8.

Fig. 10 is a transverse sectional view taken on the line 10—10 of Fig. 8.

Fig. 11 is a transverse sectional view taken on the line 11—11 of Fig. 8.

Fig. 12 is a view of a strip of material from which the ring shown in Figs. 7-11, inclusive, is made.

A ring embodying the features of the invention is of the type which is made from a strip of sheet metal punched or sheared and then bent to form the ring. The ring is also characterized by being of that type which is circumferentially expansible, the ends of the ring abutting each other when it is in operative position in the cylinder. The present ring may be characterized by the fact that it is highly expansible circumferentially and may be said to have this characteristic to a much greater degree than other rings of this type.

The ring is also characterized by the fact that no metal from the strip is punched out as scrap in forming the ring, all of the metal of the strip remaining in the ring with the different portions provided by the shearing being bent in the formation of the ring. There is perhaps one minor exception to the foregoing, which consists in punching small holes at the ends of lines of shear to avoid stress concentration. With this minor exception and with the exception of the small amount of metal removed by grinding, all of the metal of the original strip is to be found in the ultimate ring.

The ring comprises generally a pair of spaced, segmental rails connected by web members. The segments in each rail are circumferentially connected to one another by resiliently formed tongues and the segments in one rail are connected to those in the other rail by the web members. Where, in previous rings comprising segmental rails and web members, the circumferential expansibility was attained solely through the resilience of the web members, the present ring utilizes not only such resilience but also the resilience of the above-mentioned tongues so that for a given load a much greater circumferential expansion may be obtained in the present ring.

One embodiment of the invention shown in Figs. 1-6 inclusive of the drawings can perhaps best be described by describing the manner in which it is made. Thus, referring first to Fig. 6, I provide an elongated strip of sheet metal of the desired thickness. This strip is slitted or sheared transversely by slits 20 extending inwardly from the two edges of the strip in staggered relation in the respective edges. The slits 20 extend inwardly for a predetermined distance, then branch laterally to provide longitudinally extending portions 21 and thence transversely to provide branched portions 22 in the central part of the strip. The ends of the branched portions 22 preferably terminate in punched holes 23 to prevent stress concentration at the ends of the branched slits or shears 22. The branched slits 22 together with the longitudinally extending portions 21 form tongues 24.

The strip is also slitted or sheared transversely by slits 25 extending inwardly from the opposite edges of the strip in staggered relation in the respective edges and part way into the tongues 24. Each slit 25 is aligned with the slit 20 in the opposite edge of the strip, the slit 25 being terminated short of the slit 20 and preferably having a round punching 26 at its end to prevent stress concentration.

The strip is then folded longitudinally along lines indicated in Fig. 6 at 30, and is formed into arcuate shape, and the tongues 24 are bent in a manner hereinafter described. While the bending of the tongues 24 may be performed prior to the folding on the lines 30, the invention is in no way limited to particular order in which these operations are performed. The bending of the strip along the longitudinal lines 30 forms the strip into one having a U-shape cross section, the arms of the U comprising a pair of spaced rails the outer edges of which are adapted to form the outer periphery of the ring when the strip is formed into annular shape. Each rail thus comprises a series of segments 31 formed as a result of the slits 20 and 25. The formation of the ring into an annular shape of desired diameter provides slight gaps in each rail between adjoining segments, the gaps, of course, increasing upon circumferential expansion of the ring. The tongues 24 are bent out of the plane of the central portion of the strip in a manner hereinafter described, leaving circumferentially spaced portions 32 in the central part of the strip which constitute web members connecting the two rails. The web members 32 thus are located at the inner periphery of the ring and the spaces between them provide for passage of oil to the interior of the groove in the piston in which the ring is located. It will be noted by an inspection of the figures, particularly Fig. 6, that each segment in each rail is aligned with a segment in the opposite rail and is connected thereto solely by a single web member 32.

With the foregoing structure, the segments 31 in each rail may be said to be arranged in pairs, each pair comprising the two segments which are joined by a single tongue 24. Thus, as shown in Fig. 6, the two segments indicated at 31a may be said to constitute a pair since they are both integrally connected directly to a single tongue indicated at 24a. The pairs of segments are connected to each other circumferentially through the web members, segments, and tongues of the opposite rail. Thus, as an example, the left-hand segment 31a in Fig. 6 is connected to the segment indicated at 31b by the web members 32a and 32b, the segments 31c in the opposite rail connected to such web members 32a and 32b by the tongue 24b. Through such connection between a segment 31a and a segment 31b, the ring is made highly expansive in a circumferential direction. Heretofore in rings of this general character, the circumferential expansion between adjoining segments of this character has been due to the flexing of the web members. In the present instance, not only the flexing of the web members 32a and 32b but also the flexing of the two portions of the tongue 24b formed by the slit therein provides for the circumferential expansion. As a result, the segments 31a and 31b may expand relative to each other to a much greater extent for a given load than in prior structures of this character. Stated in another way, the web members 32a and 32b have to deflect through a smaller angle, because of the deflection between the two portions of the tongue 24b, for a given expansion between the segments 31a and 31b. It will, of course, be apparent that the expansion between the two segments of a pair, that is, between the two segments indicated at 31a, will be less than the expansion between the segments 31a and 31b.

As heretofore mentioned, the tongues 24 are bent to extend into the space between the two rails so that openings are provided in the inner periphery of the ring between the web members 32. In the form of ring shown in Figs. 1–6, the tongues 24 are bent into such space and are arranged to fulfill another purpose, namely, that of controlling the axial flow of oil past the rings. Some flow of oil in that direction will tend to occur because of the small gaps between adjacent segments 31, and because of the fact that the segments in one rail are aligned with the segments in the opposite rail, the gaps between the segments in each rail are thereby aligned with the gaps in the opposite rail. To decrease such passage of oil, the tongues are utilized as sealing members to reduce the flow through the gaps between the segments. In the arrangement shown in Figs. 1–6, the tongues being in staggered relation to each other in the respective rails, are utilized to seal alternate gaps in each rail with the sealed gaps in one rail in staggered relation to the sealed gaps in the other rail. To this end, each tongue 24 is reversely bent to extend outwardly into the space between the rails and in face-to-face engagement with the pair of segments which it connects. The tongue is so proportioned in length that it extends to the outer periphery of the ring, as is evident in Figs. 4 and 5. Thus, the unslitted portion of each tongue 24 bridges the gap between adjacent segments 31 at the outer edge of such segments and prevents or at least reduces the flow of oil through such gap.

In the form of ring shown in Figs. 7–12 inclusive, the ring has substantially the same form and is made in substantially the same way as the ring shown in Figs. 1–6 except for the fact that the tongue is utilized in a somewhat different manner. In the form shown in Figs. 7–12, the tongue is reversely bent as at 40 to extend outwardly as at 41, in the space between the rails, and then is provided with a right-angle bend 42 so that the tongue extends axially of the ring toward the opposite rail. By changing the length of the slits, as shown by a comparison between Figs. 12 and 6, the tongue, in this instance indicated at 43, may be made long enough to engage the opposite flange and thus serve as a support or strut to hold the two rails in uniformly spaced relation.

In both forms of rings shown in the drawings, a large circumferential expansion for a given load is obtained and for any given amount of circumferential expansion, only a small angular deflection of metal at any point in the ring occurs. By providing the two sets of slits 20 and 25, segments of relatively narrow circumferential width are obtained, increasing the number of such segments for a circle of a given diameter and thereby maintaining the width of the gap between ad-

I claim:

1. A piston ring of sheet metal comprising a pair of segmental rails connected to each other by web members, adjoining segments of each rail being connected to one another by tongues extending between the rails.

2. A piston ring of sheet metal comprising a pair of segmental rails connected to each other by web members, the segments of each rail being arranged in pairs with the pairs connected to one another by the web members and segments of the opposite rail, and the segments of each pair being connected to one another by tongues extending between the rails.

3. A piston ring of sheet metal comprising a pair of segmental rails connected to each other by web members, and tongues extending from the segments and providing the circumferential connection between the segments.

4. A piston ring of sheet metal comprising a pair of segmental rails connected to each other by web members, the segments of each rail being arranged in pairs with the pairs circumferentially connected through tongues in the opposite rail.

5. A piston ring of sheet metal comprising a pair of segmental rails connected to each other by web members, each segment of each rail being connected to an adjoining segment by a tongue and to a segment in the opposite rail by one of said web members.

6. A piston ring of sheet metal comprising a pair of segmental rails connected to each other by web members, each segment of each rail having connections to the adjoining segments at its sides, the connections on opposite sides of each segment having different amounts of circumferential expansion for a given load.

7. A piston ring of sheet metal comprising a pair of segmental rails connected to each other by web members, the connection of each segment to the adjoining segment at one side being by means extending only from the rail of which said segment forms a part, and the connection to the adjoining segment at its other side being by means extending from the opposite rail.

8. A piston ring of sheet metal comprising a pair of segmental rails connected to each other by web members, and a connection between a pair of segments in one rail cooperating with web members connected to said pair to provide for circumferential expansion between a pair of segments in the opposite rail.

9. A piston ring of sheet metal comprising a pair of segmental rails connected by web members extending from the inner edges of the rails, and tongues extending from the inner edges of and connecting adjoining segments in one rail and cooperating with said web members to provide for circumferential expansion between segments in the opposite rail.

10. A piston ring comprising a strip of sheet metal having slits extending inwardly from each edge with each slit branching in the central portion of the strip to form a tongue between the branches and to form web members between the branches of adjacent slits, each tongue being slitted for a portion of its length by a slit extending inwardly from the opposite edge, the strip being bent along longitudinal lines to form a pair of rails connected by the web members with the edges of the strip forming the outer periphery of the ring, the slits dividing the rails into segments, and the tongues being bent into the space between the rails.

11. A piston ring comprising a pair of spaced segmental rails connected to each other by web members, and slitted tongues extending alternately from the respective rails and resiliently and circumferentially connecting the segments.

12. A piston ring comprising a pair of spaced rails connected by web members, each rail comprising a plurality of segments, and tongues extending inwardly from the segments to circumferentially connect the segments, said tongues being reversely bent to extend into the space between the rails.

13. A piston ring comprising a pair of spaced rails connected by web members, each rail comprising a plurality of segments, and tongues circumferentially connecting adjacent segments and bridging the spaces between such segments to provide a seal against flow of oil axially therethrough.

14. A piston ring comprising a pair of spaced rails connected by web members, each rail comprising a plurality of segments arranged in pairs, each pair of segments having a tongue slitted for a portion of its length with the slitted end connected to the segments and the slit separating the segments, said tongue extending into the space between the rails with the unslitted end engaging the segments and bridging the space therebetween to provide a seal.

JOHN F. SHIRK.

REFERENCES CITED

The following references are of record in the file of this patent:

UNITED STATES PATENTS

| Number | Name | Date |
|---|---|---|
| 2,267,367 | Bowers | Dec. 23, 1941 |
| 2,267,369 | Bowers | Dec. 23, 1941 |
| 2,296,332 | Bowers | Sept. 22, 1942 |
| 2,345,176 | Bowers | Mar. 28, 1944 |
| 2,421,175 | Zahodiakin | May 27, 1947 |